US012746729B2

(12) United States Patent
Hübner et al.

(10) Patent No.: US 12,746,729 B2
(45) Date of Patent: Sep. 29, 2026

(54) PROCESS FOR THE PRODUCTION OF A COVER WALL SECTION OF A FLEXIBLE COVER, AND COVER WITH A COVER WALL CONSISTING OF AT LEAST ONE COVER WALL SECTION PRODUCED WITH THE PROCESS

(71) Applicant: HÜBNER GmbH & Co. KG, Kassel (DE)

(72) Inventors: Reinhard Hübner, Kassel (DE); Andreas Wiegrefe, Fulda (DE); Christian Hirling, Bad Karlshafen (DE); Kathleen Kammel, Baunatal (DE)

(73) Assignee: HÜBNER GmbH & Co. KG, Kassel (DE)

( * ) Notice: Subject to any disclaimer, the term of this patent is extended or adjusted under 35 U.S.C. 154(b) by 206 days.

(21) Appl. No.: 17/845,347

(22) Filed: Jun. 21, 2022

(65) Prior Publication Data

US 2022/0410506 A1 Dec. 29, 2022

(30) Foreign Application Priority Data

Jun. 24, 2021 (EP) .................................... 21181453

(51) Int. Cl.
*B29C 70/42* (2006.01)
*B29C 70/56* (2006.01)
*B29L 31/00* (2006.01)

(52) U.S. Cl.
CPC .............. *B29C 70/42* (2013.01); *B29C 70/56* (2013.01); *B29L 2031/776* (2013.01)

(58) Field of Classification Search
None
See application file for complete search history.

(56) References Cited

U.S. PATENT DOCUMENTS

| | | | | |
|---|---|---|---|---|
| 3,772,929 A | 11/1973 | Redmond, Jr. | | |
| 4,905,607 A | 3/1990 | Wanneroy | | |
| 5,468,138 A * | 11/1995 | Bosse | B29C 55/10 | 425/DIG. 53 |
| 5,953,998 A | 9/1999 | Petit | | |
| 2009/0007981 A1 * | 1/2009 | Khokar | D03D 47/18 | 139/383 A |
| 2010/0075085 A1 | 3/2010 | Koukal | | |

(Continued)

FOREIGN PATENT DOCUMENTS

| | | |
|---|---|---|
| DE | 593970 C | 3/1934 |
| DE | 2249488 A1 | 4/1973 |

(Continued)

*Primary Examiner* — Farah Taufiq
(74) *Attorney, Agent, or Firm* — Dinsmore & Shohl LLP

(57) ABSTRACT

A molding process for the production of a cover wall section for a cover in which the cover wall section has at least one multi-layer fabric that has a reinforcement and, at least on one side, preferably on both sides, a polymer coating, has the following process steps: Provision of at least one multi-layer fabric; draping of the at least one fabric over a molding surface of a mold and stretching of the at least one fabric across the molding surface by at least one tension element; and curing of the at least one fabric and/or the at least one tension element in such a way that the cover wall section is fixed in its shape.

17 Claims, 9 Drawing Sheets

(56) References Cited

U.S. PATENT DOCUMENTS

| | | | | |
|---|---|---|---|---|
| 2012/0071286 | A1* | 3/2012 | Pasch | F16G 1/10 156/137 |
| 2014/0291938 | A1 | 10/2014 | Koukal et al. | |
| 2019/0185027 | A1* | 6/2019 | Busch | B60D 5/003 |
| 2020/0023699 | A1* | 1/2020 | Busch | B60D 5/006 |

FOREIGN PATENT DOCUMENTS

| | | | | | |
|---|---|---|---|---|---|
| DE | 69705093 | T2 | | 2/2002 | |
| DE | 102010041179 | A1 | * | 3/2012 | B29B 11/16 |
| DE | 102011107370 | A1 | | 1/2013 | |
| DE | 102017102626 | A1 | | 8/2018 | |
| EP | 0922621 | A1 | | 6/1999 | |
| EP | 2091766 | A1 | | 8/2009 | |
| GB | 1298936 | A | * | 12/1972 | B29C 70/023 |
| WO | 2013023634 | A1 | | 2/2013 | |

* cited by examiner

PROCESS FOR THE PRODUCTION OF A COVER WALL SECTION OF A FLEXIBLE COVER, AND COVER WITH A COVER WALL CONSISTING OF AT LEAST ONE COVER WALL SECTION PRODUCED WITH THE PROCESS

CROSS-REFERENCE TO RELATED APPLICATIONS

This application claims priority to European Patent Application No. 21181453.8, filed Jun. 24, 2021, the entire content of which is incorporated herein by reference.

FIELD OF THE INVENTION

The present invention concerns a molding process for the production of a cover wall section and a cover with a cover wall consisting of at least one cover wall section produced with the process.

The flexible cover preferably is a gangway bellows. A generic gangway bellows is designed, e.g., as a folding or corrugated bellows. The folding or corrugated bellows has a bellows wall with folds or corrugations that encloses a tunnel-shaped or channel-shaped bellows interior space. The bellows wall consists of at least one multi-layer fabric having a reinforcing material that is coated at least on one side, preferably on both sides, with a polymer coating, the reinforcing material having at least one textile fabric.

When producing the individual folds of a folding bellows, individual material strips made of the material of the bellow wall are sewed together concertina-like along their long sides lying next to each other, and the sewed-up long sides are clamped, in particular wedged in, by U-shaped bellows tensioning frames. The bellows tensioning frames are hence arranged at the individual fold edges and stabilize them.

BACKGROUND OF THE INVENTION

When producing the individual corrugations of a corrugated bellows, individual material strips made of the material of the bellow wall can usually likewise be sewed together along their long sides to form the corrugations and/or be taken up by aluminum sections and be clamped and connected by them. Seen in circumferential direction, a corrugation can consist of one single material strip or several sewed-up material strips. The corrugated contour has wave crests and wave troughs, and the corrugations can be sewed together in the area of the wave troughs, and/or the long sides lying next to each other and being sewed together in the area of the wave troughs can also be clamped, in particular wedged in, by U-shaped bellows tensioning frames.

Accordingly, the effort of producing the folding or corrugated bellows is relatively high.

Moreover, a bellows or part of a bellows is known from EP 0 922 621 A1 in which a textile inlay is vulcanized into an elastomer layer and in which the bellows is designed as a corrugated or folding bellows, or part thereof, and the corrugations or folds are of a single-part design in their curved parts and in which the textile inlay is a knitted fabric.

Furthermore, according to EP 0 922 621 A1, side walls, bottom sections, or ceiling sections of the bellows with multiple folds or corrugations arranged one behind the other can be produced by means of an appropriate mold. Or, if the mold is large enough, complete bellows or bellows halves can be produced. The advantage of bellows or bellows sections produced as single parts according to this principle is that they also are highly durable which results from the fact that the surface of the components can be kept absolutely even.

They can be produced by inserting an elastomer layer into a fold-shaped or corrugation-shaped mold, placing a knitted fabric layer onto the elastomer layer, and placing a further elastomer layer onto the knitted fabric, using vulcanization to connect the elastomer layers with each other and with the knitted fabric.

Another known embodiment is that the gangway bellows, or its wall, is designed without corrugations and without folds. In this case, the wall is of an appropriate elastic design. This has been disclosed, e.g., in the German patent application DE 10 2011 107 370 A1.

SUMMARY OF THE INVENTION

The task of the present invention is to provide a simple and cost-effective molding process for the production of a high-quality cover wall section for a flexible cover.

A further task is the provision of a cover with a cover wall of the type described.

These tasks are solved with a process having the features disclosed herein and with a cover having the features disclosed herein. Beneficial embodiments of the invention are also shown.

BRIEF DESCRIPTION OF THE DRAWINGS

In the following, the invention is explained in more detail by means of a drawing that shows an example. The figures show.

DETAILED DESCRIPTION OF THE INVENTION

Figure 1:
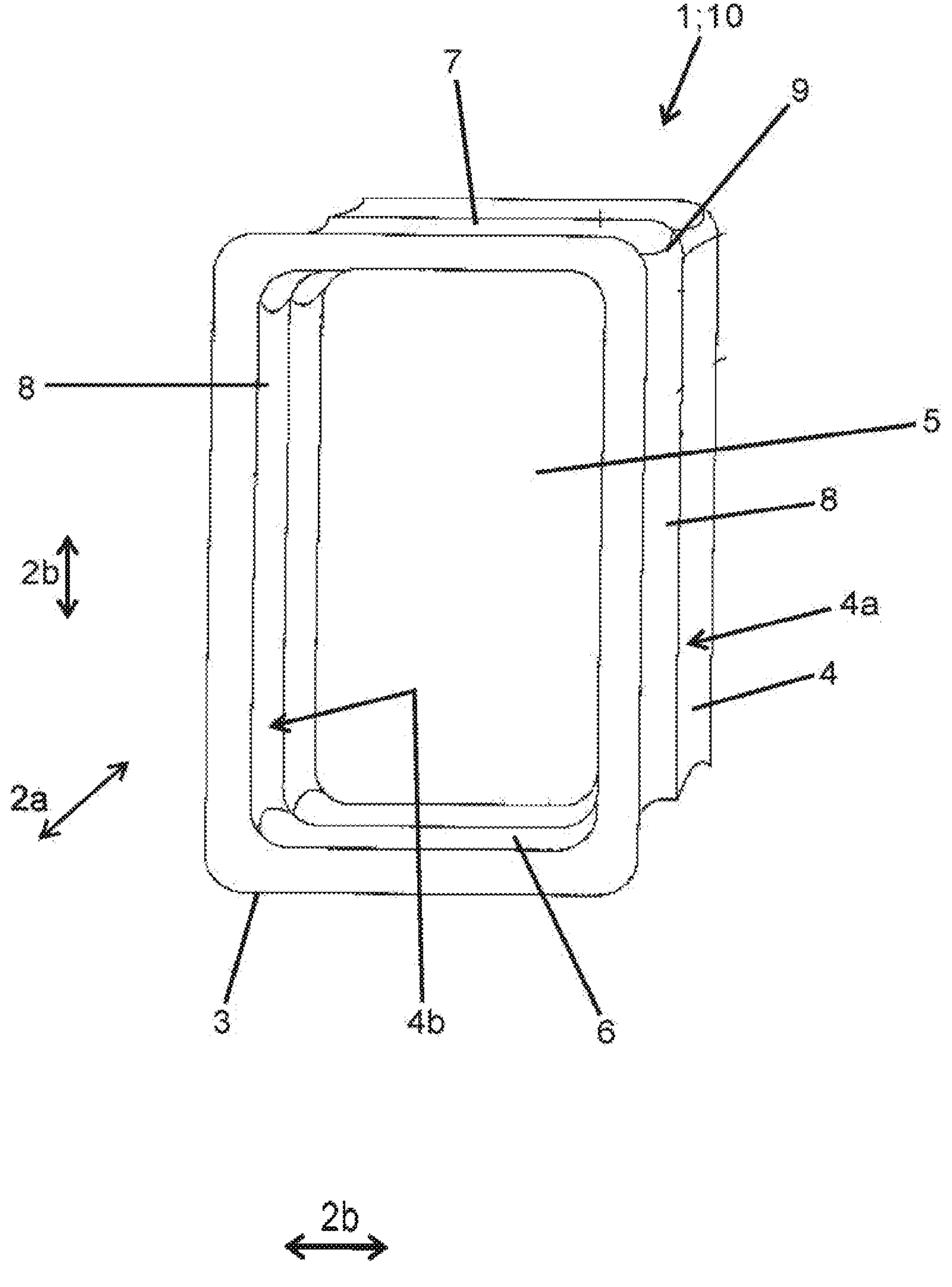
FIG. 1 is a schematic perspective view of a cover shaped as a folding bellows.

The cover 1 (FIG. 1) according to the invention has a cover longitudinal direction 2*a* and a cover circumferential direction 2*b* perpendicular thereto. Furthermore, the cover 1 has multiple cover tensioning frames 3 arranged at a distance to one another in cover lengthwise direction 2*a* that are circumferential or extend in cover circumferential direction 2*b*, and a cover wall 4 clamped into the cover tensioning frames 3 or stretched by them. The cover wall 4 encloses a tunnel-shaped or channel-shaped cover interior space 5. Moreover, the cover wall 4 has a cover wall outer side 4*a* and a cover wall inner side 4*b*.

Furthermore, the cover tensioning frames 3 are preferably of a rectangular shape. As a consequence, the cover 1 preferably has a rectangular cross-section or is box shaped. Moreover, the cover wall 4 has a cover bottom 6, preferably horizontal, a cover ceiling 7, preferably horizontal, and two cover side walls 8, preferably vertical. The cover bottom 6 and the cover ceiling 7 each merge into the cover side walls 8 via cover wall corner areas 9.

However, the cover 1 can also have a different cross-section, e.g., a circular cross-section (not shown).

The cover 1 preferably is a bellows with bellows ceiling, bellows side walls, and bellows bottom. Accordingly, in this case, the cover lengthwise direction 2*a* corresponds to a bellows lengthwise direction. The cover tensioning frames 3 are bellows tensioning frames, and the cover wall 4 is a bellows wall with bellows wall outer side and a bellows wall inner side, etc.

Figure 9:
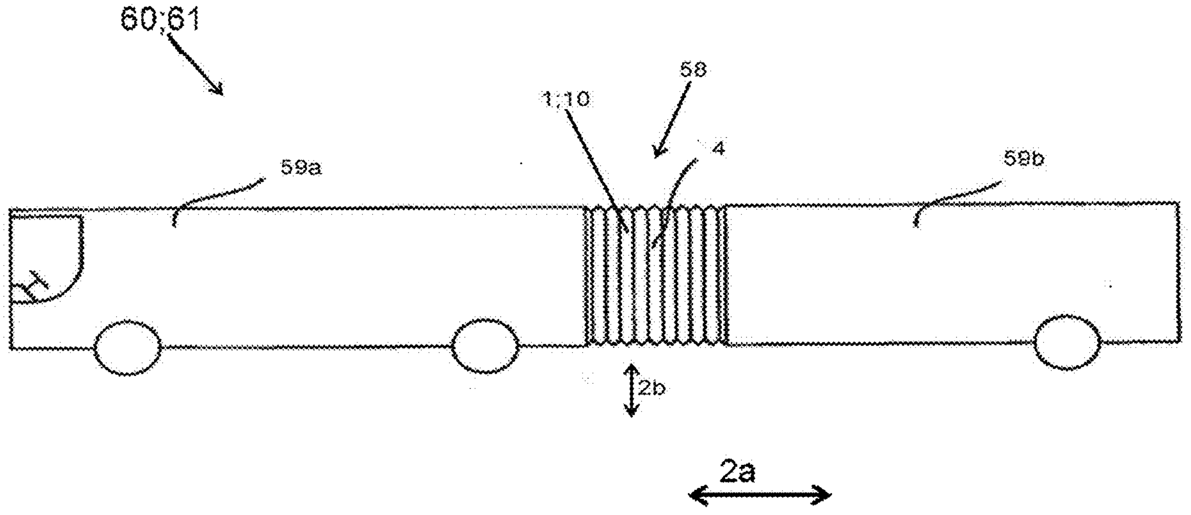
FIG. 9 is a schematic side view of a gangway between two vehicle parts with a gangway bellows shaped as a folding bellows.

The bellows preferably is a corrugated or a folding bellows 10 (FIG. 1 or 9).

Figure 2:
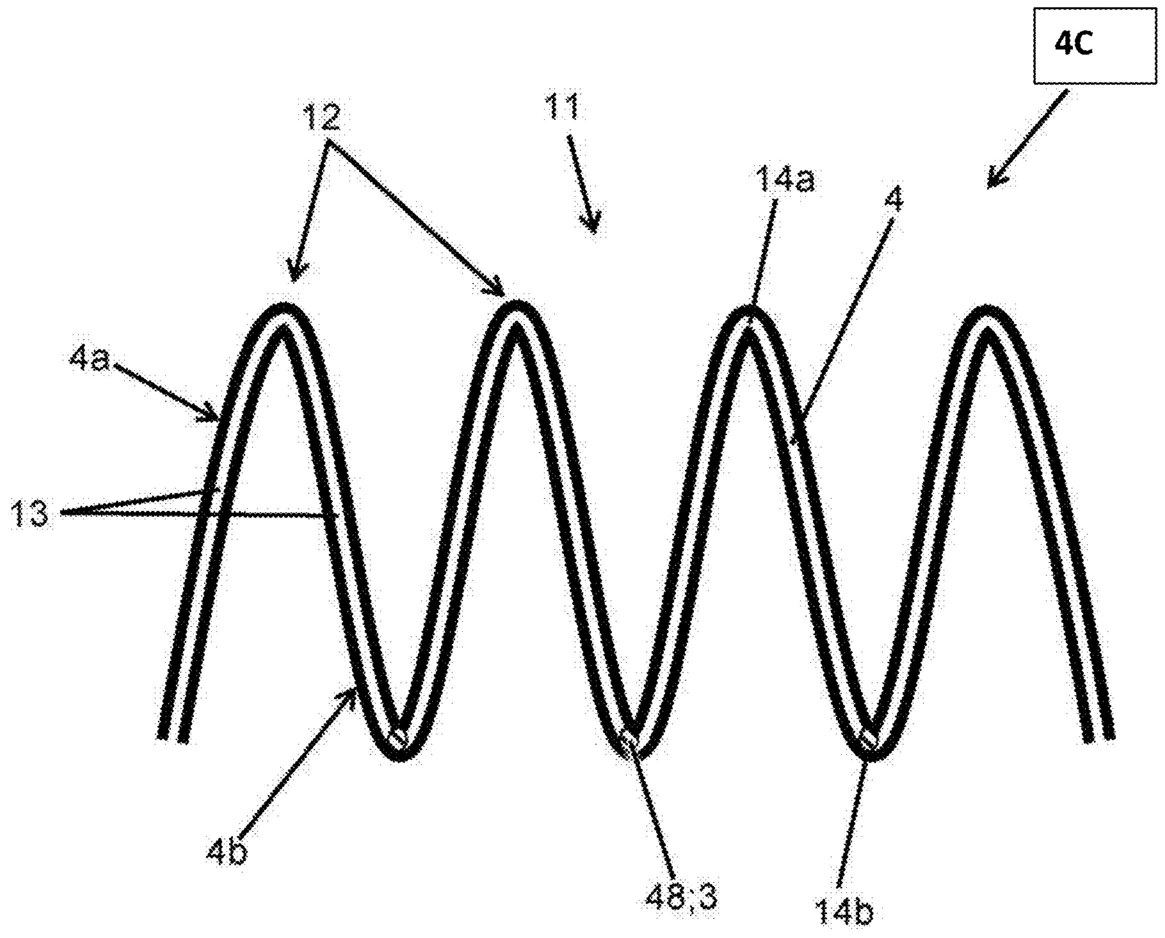
FIG. 2 is a highly simplified and very schematic view of a cross-section of a fold-shape cover wall section produced in accordance with the invention.

The cover wall 4 of the folding bellows 10 is of an actually known concertina-like design, having a folded contour 11 with folds 12 (FIG. 2). The folds 12 each have fold flanks 13 that merge into each other pairwise via alternating first, or inner, and second, or outer, fold edges 14*a;b*. Moreover, the folds 12 are arranged adjacent to each other in cover lengthwise direction 2*a*.

In addition, the cover wall 4 is clamped in a cover tensioning frame 3 on at least one part of the fold edges 14*a;b*.

Figure 3:
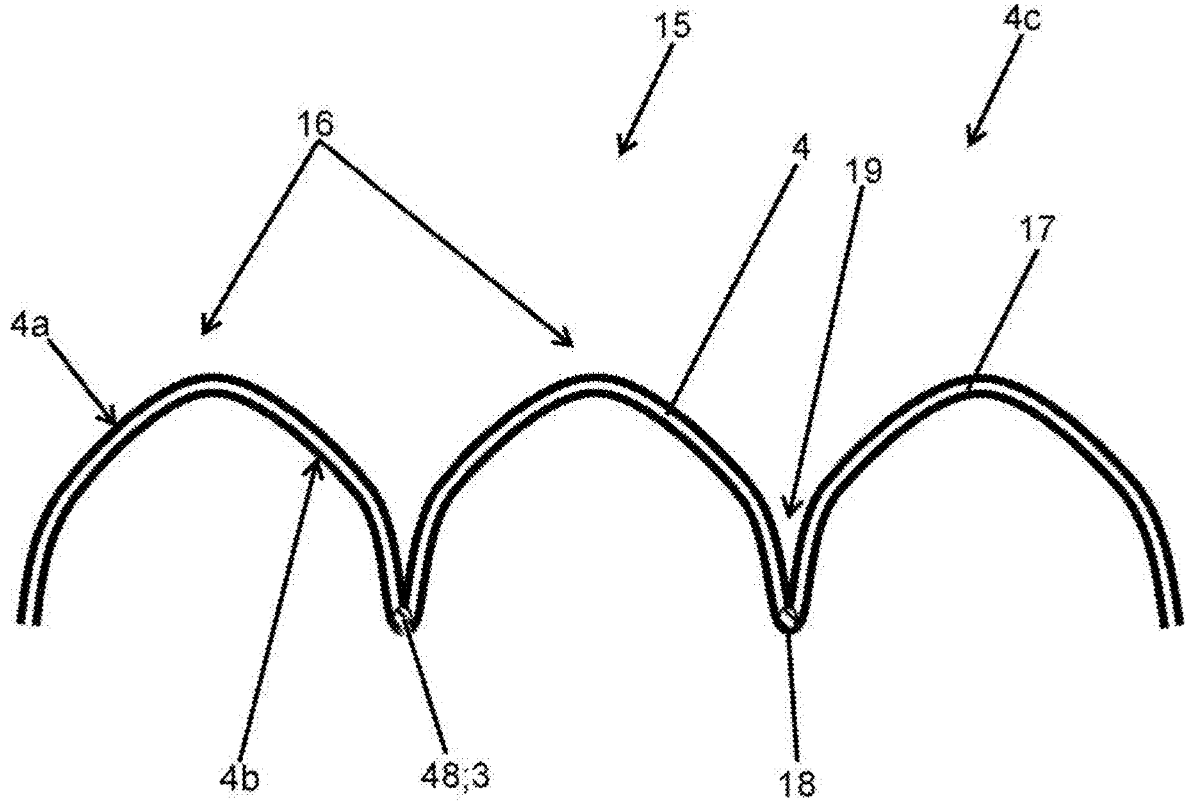
FIG. 3 is a highly simplified and very schematic view of a cross-section of a corrugation-shape cover wall section produced in accordance with the invention.

In the case of the corrugated bellows 10, the cover wall 4 has a corrugated contour 15 with corrugations 16 in an actually known manner (FIG. 3). The individual corrugations 16 each have a U-shaped cross-section. The corrugations 16 are likewise arranged adjacent to each other in cover lengthwise direction 2*a*. Moreover, the corrugations 16 each have a rounded wave crest 17. Furthermore, the individual adjacent corrugations 16 each merge into each other via an inner corrugation edge 18. Moreover, a wave trough 19 exists between neighboring corrugations 16, when seen from the cover wall outer side 4*a*.

In addition, the cover wall 4 is clamped in a cover tensioning frame 3 on at least one part of the corrugation edges 18*b*.

Figure 4:
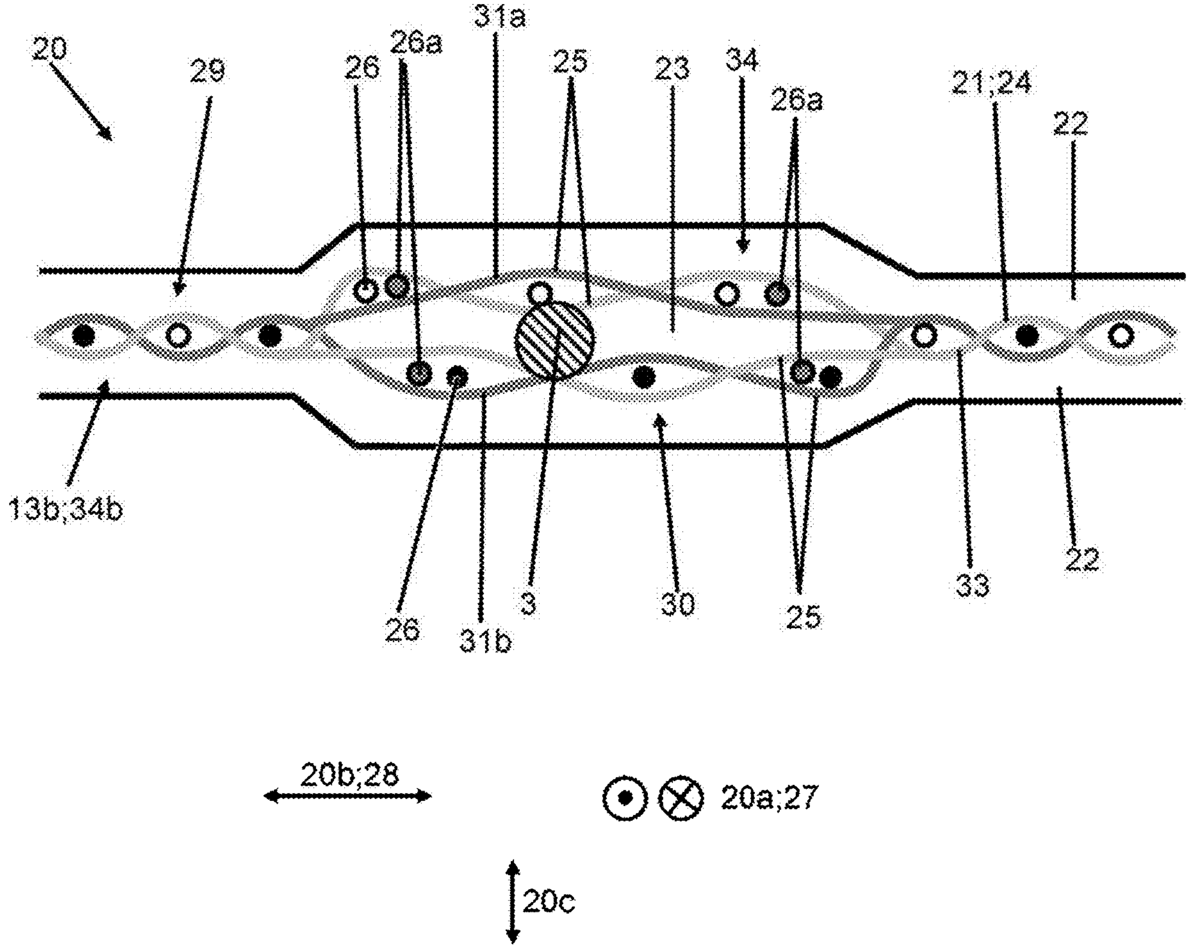
FIG. 4 is a highly simplified and very schematic view of a cross-section of a fabric with a backing fabric with a channel and reinforcing warp threads.
Figure 5:
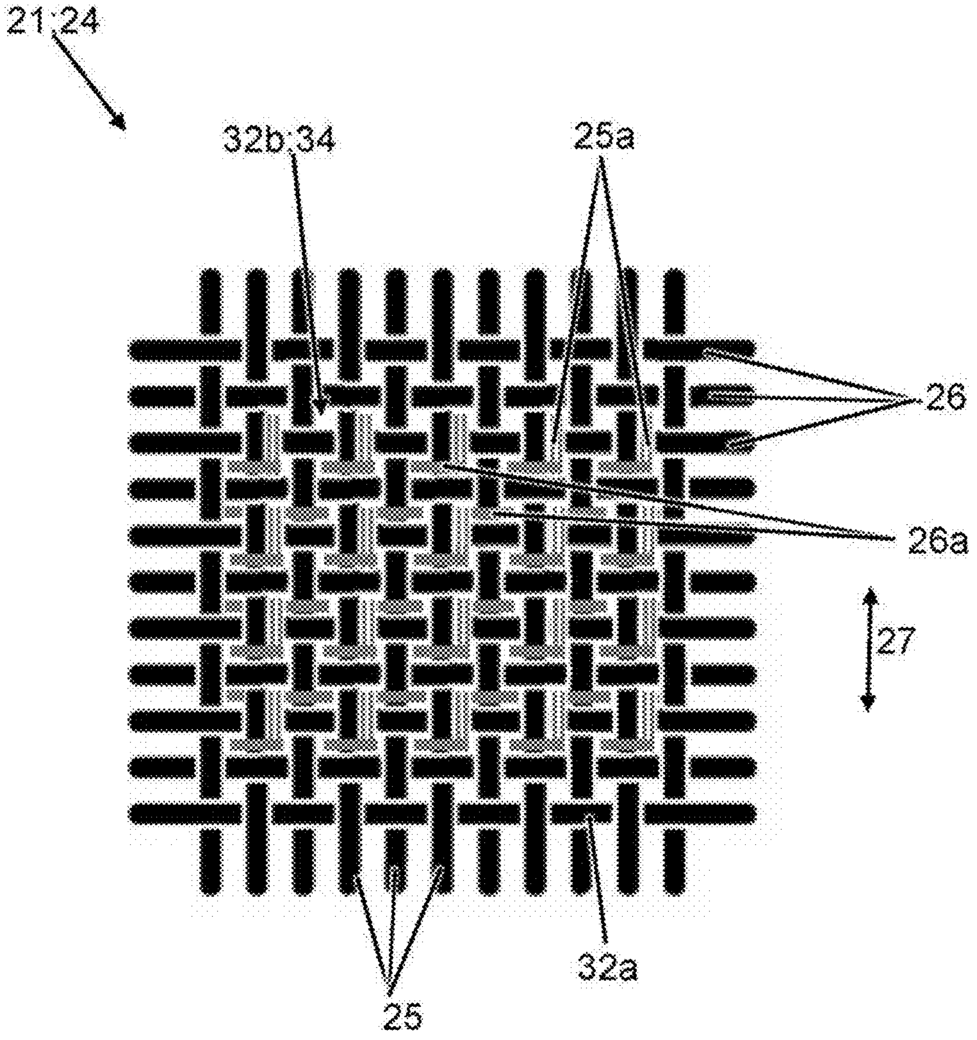
FIG. 5 is a schematic top view of a backing fabric of the fabric according to an embodiment with reinforcing warp threads and reinforcing weft threads.

As is likewise actually known, the cover wall 4 consists of a multi-layer fabric 20 (FIG. 4). The flexible multi-layer fabric 20 has a central, sheet-like reinforcing material layer or a central, sheet-like reinforcing material 21 that has an outer or outer-side polymer coating 22 on both sides. The polymer coating 22 forms the outer side of the multi-layer fabric 20.

Moreover, the multi-layer fabric 20 has a first spatial direction or planar direction 20*a* and a second spatial direction or planar direction 20*b* perpendicular thereto. Or the multi-layer fabric 20 has an areal extension into the first and second planar direction 20*a;b*. Moreover, the fabric 20 has a thickness direction or height direction 20*c* perpendicular to the two planar directions 20*a;b*. Accordingly, the sheet-like reinforcing material 21 likewise has an areal extension into the first and second planar direction 20*a;b*, and a height-wise or thickness-wise extension in the thickness direction 20*c*.

The polymer coating 22 consists of a polymer matrix 22 in which preferably filling materials, in particular flame-retardant filling materials, are embedded. The polymer matrix 22 in particular consists of a polymeric material or polymer in accordance with DIN 7724-1993-04. The polymer matrix 22 preferably consists of an elastomer in accordance with DIN 7724-1993-04. Accordingly, elastomers are dimensionally rigid, but elastically deformable polymers with a glass transition point below the temperature of use. The elastomers can deform elastically under tensile and compression stress, but subsequently return to their original, undeformed shape. The polymer matrix 22 is preferably made of vulcanized caoutchouc (rubber), in particular vulcanized silicon caoutchouc (silicon rubber) or vulcanized natural caoutchouc (natural rubber), or CSM (chlorosulfonated polyethylene) or EPDM (ethylene-propylene-diene caoutchouc) or EVA (ethylene vinyl acetate) or PVC (polyvinyl chloride) or PU (polyurethane), or mixtures thereof.

According to a preferred embodiment of the invention, the fabric 20, preferably the reinforcing material 21, has channels 23 for accommodating at least one cover tensioning frame 3.

The channels 23 can be formed in different ways. Preferably, the channels are created in accordance with the German patent application DE 10 2016 109 070 A1, the disclosure content of which is incorporated herein by reference in its entirety.

In this case, the reinforcing material 21 has a backing fabric 24. In an actually known manner, the backing fabric 24 has warp threads 25 extending into the first planar direction 20*a*, and weft threads 26 extending in parallel with the second planar direction 20*b* crosswise to the warp threads 25. The first planar direction 20*a* hence corresponds to a warp direction 27, and the second planar direction 20*b* hence corresponds to a weft direction 28 of the backing fabric 24.

The warp and weft threads 25;26 preferably are monofilament threads or multifilament threads. Monofilament threads consist of one single monofilament. Multifilament threads consist of multiple monofilaments. The monofilaments can be made of one piece (monolithic) or have a core/sheath structure. A multifilament thread can have different monofilaments, e.g., of different materials. Moreover, the warp and weft threads 25;26 can also be made of staple fiber yarn, also with a filament core, or of a twine thereof, or of hybrid twine. Hybrid twines consist of monofilament and multifilament threads.

According to the beneficial embodiment, the backing fabric 24 is then designed in such a way that it has at least one channel or alley or lead-through 23 extending through the backing fabric 24 perpendicular to the height direction 20*c* or in at least one of the two planar directions 20*a;b*. Preferably, the backing fabric 24 has multiple channels 23. The channels 23 have at least one, preferably two, channel ends where they open to the surroundings.

The channels 23 are created by appropriate joining or interweaving of the warp and/or weft threads 25;26 (see FIG. 4).

Of course, the channels 23 can be formed also by other joining types and weaving techniques and knitted fabric types and ready-made clothing technologies, as shown in FIG. 4. For example, in the case of fabrics, the warp and weft threads 25;26 should be weaved together in such a way that both single-layer, channel-free fabric areas 29 and two-layer fabric areas 30 with single-layer, non-joined fabric layers 31*a*;31*b* are created from the same warp and weft threads 25;26, or the same thread material.

Furthermore, it is within the scope of the invention that the reinforcing material 21 is of a multi-layer design and consists of multiple textile fabrics bonded together by a bonding layer consisting of a polymer. At least one of the textile fabrics is the backing fabric 24 described. Preferably, however, the reinforcing material 21 consists of the backing fabric 24. Furthermore, a bonding layer, preferably consisting of a polymer, can be present between the polymer coating 22 and the reinforcing material 21.

Of course, it is also within the scope of the invention that the channels 23 in the fabric 20, in particular in the reinforcing material 21, are created in a different way. For example, they can be designed in accordance with EP 2 091 766 A1, the disclosure content of which is incorporated herein by reference in its entirety. The bellows wall in accordance with EP 2 091 766 A1 has a textile upper side and a textile bottom side that are connected by means of pile threads. For example, the reinforcing material has a spacer fabric made of two fabrics (two-ply fabric) connected by the pile threads. The pile threads ensure a distance between the upper side and bottom side or the two fabrics and are at a distance to each other in the axial direction of the bellows, so that alleys or channels are formed.

Of course, other textile fabrics can be kept apart also by means of the pile threads, instead of the fabrics. In particular, the textile spacer fabric can also be a spacer knitwear, preferably a knitted or crocheted spacer fabric. Moreover, different textile fabrics can also be joined by means of the pile threads.

Also, the channels 23 can be designed in accordance with WO 2013/023634 A1, the disclosure content of which is incorporated herein by reference in its entirety. WO 2013/023634 A1 discloses a corrugated bellows in which the bellows wall has a reinforcing material that has two fabrics connected with each other in such a way that guides in the form of loops are formed. The loops serve to accommodate the bellows frame and hence facilitate mounting. Therefore, they are likewise channels. The fabrics are joined by sewing, knitting, bonding, or gluing. The fabrics can be single-layer or multi-layer fabrics that in each case have at least one textile fabric. Preferably, the textile fabric in each case is a woven fabric or knitwear, preferably a knitted or crocheted fabric, or raschel knitted fabric.

According to a further beneficial embodiment (FIG. 4, 5), the backing fabric 24, moreover, has at least two surface areas 32*a;b*, the two surface areas 32*a;b* differing in at least one mechanical property. Preferably, the two surface areas 32*a;b* differ with respect to at least one mechanical strength property. Especially preferably, the two surface areas 32*a;b* differ in at least one planar direction 20*a;b* with respect to the maximum force $F_H$ in accordance with DIN EN ISO 13934-1:2013 and/or the elongation at maximum force $\square_H$ in accordance with DIN EN ISO 13934-1:2013 and/or the ratio of tensile force in accordance with DIN EN ISO 13934-1:2013 to elongation in accordance with DIN EN ISO 13934-1:2013.

In particular, the backing fabric 24 is designed in accordance with DE 10 2017 102 626 A1, the disclosure content of which is incorporated herein by reference in its entirety. Preferably, the backing fabric 24, for example, has a ground fabric 33 and reinforcement areas 34. The ground fabric 33 is formed by the (ground) warp threads 25 or the (ground) weft threads 26. And in the area of the reinforcement areas 34, the backing fabric 24 has multiple additional reinforcing warp threads 25*a* and/or reinforcing weft threads 26*a* which are woven into or interwoven with the ground fabric 33 in addition to the ground warp threads 25 or ground weft threads 26. In addition means that the reinforcing warp threads 25*a* or reinforcing weft threads 26*a* are present not instead of the ground warp threads 25 or the ground weft threads 26, but in addition to them. That is, the warp thread density or the weft thread density of the backing fabric 24 is higher in the reinforcement areas 34 than in the non-reinforced areas.

Of course, it is also within the scope of the invention that a different textile fabric is present instead of the backing fabric, e.g., knitwear, preferably a knitted or crocheted fabric, or a non-woven fabric, with at least two surface areas that differ in at least one mechanical property. Here as well, the disclosure content of DE 10 2017 102 626 A1 is incorporated herein by reference in its entirety. The reinforcing material can also have several such textile fabrics that may also be different.

The reinforcement areas 34 are purposefully provided in places where, during use and during molding, the backing fabric 24 is subjected to higher stress, or where higher strength or stiffness is required. For example, lower strength or higher elasticity are preferred in the cover wall corner areas 9 of the cover wall 4. This will be explained in more detail below.

Figure 6:
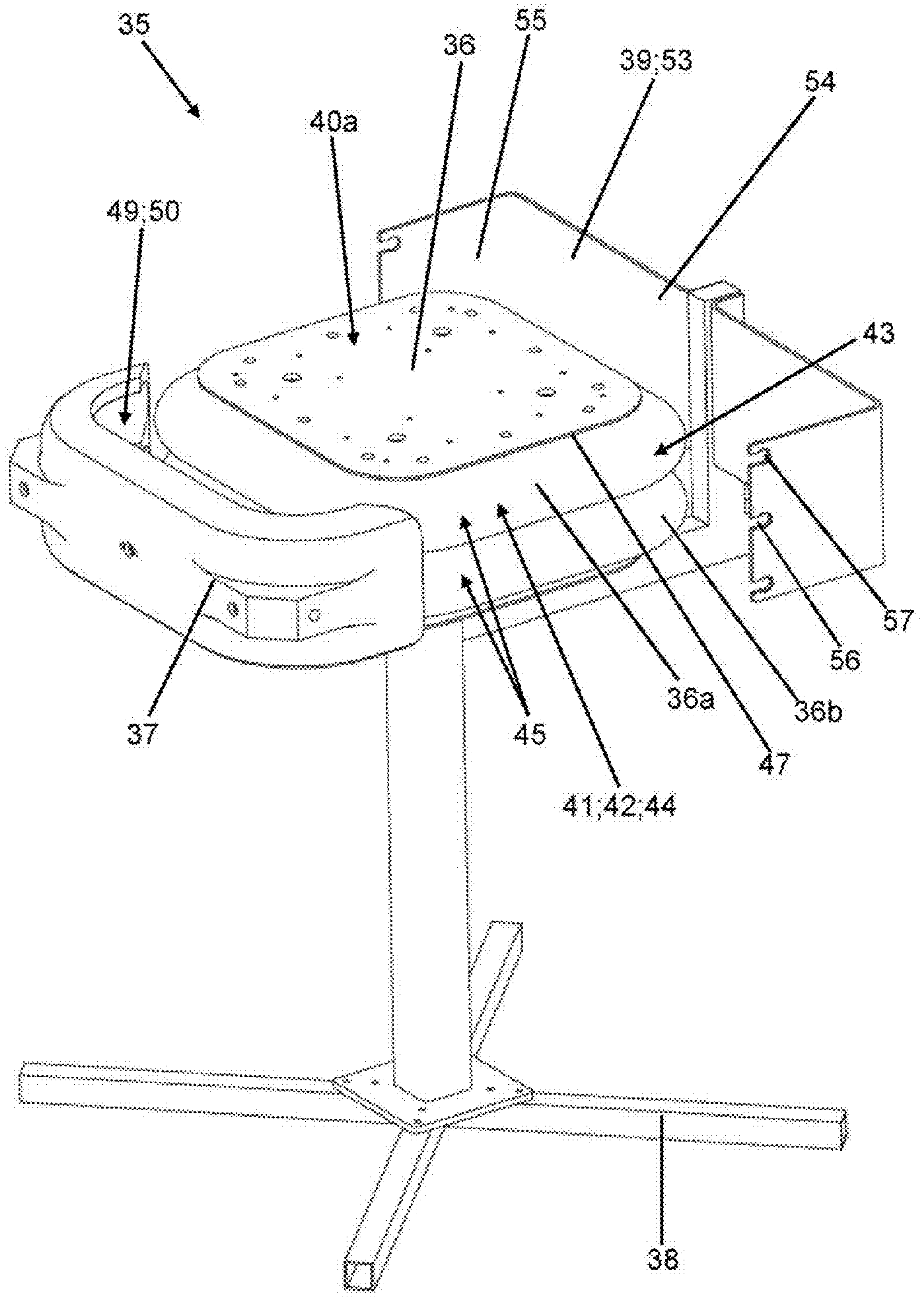
FIG. 6 is a simplified perspective view of a preferably used mold.
Figure 7:
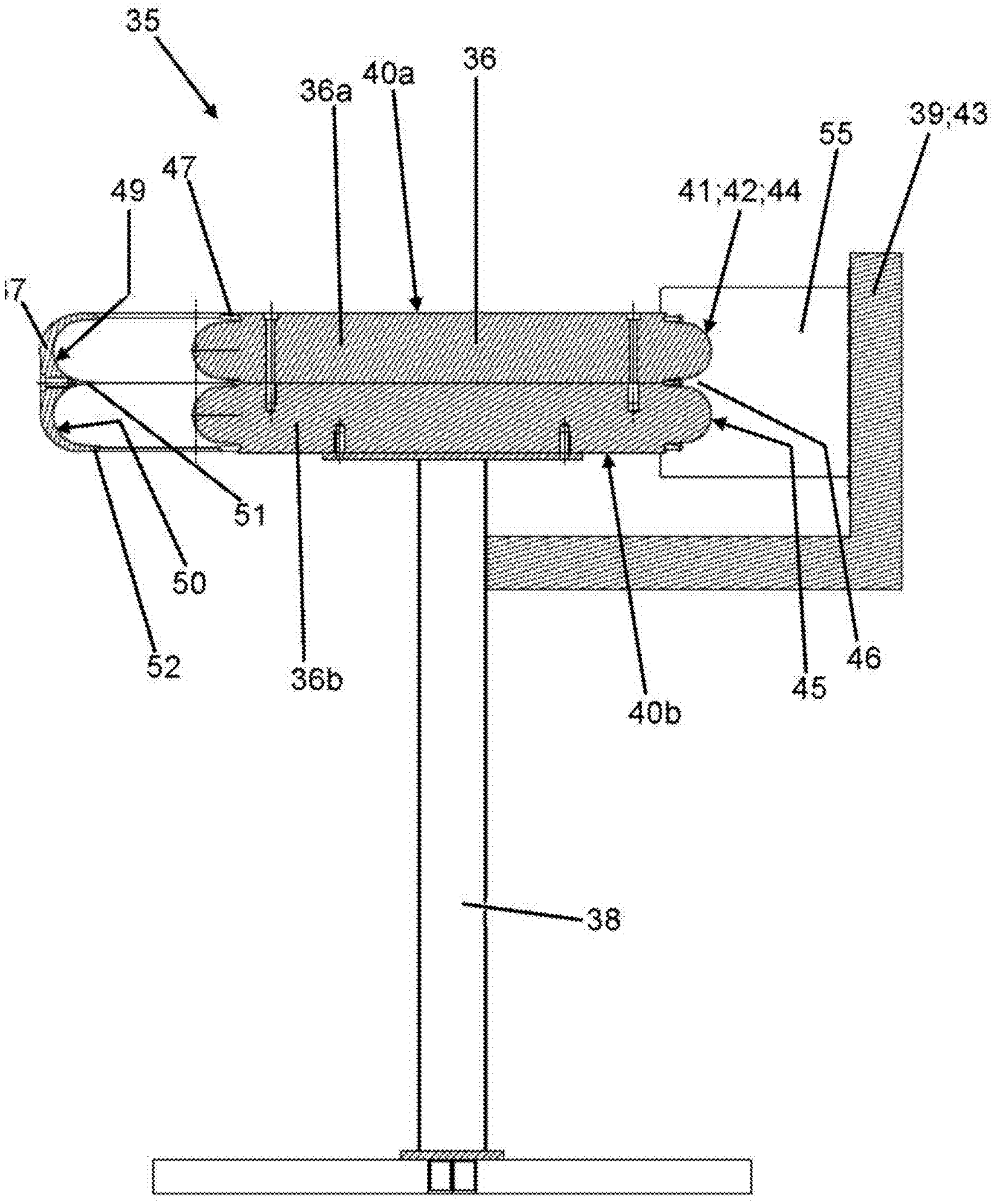
FIG. 7 is a view of a cross-section of the mold according to FIG. 6.
Figure 8:
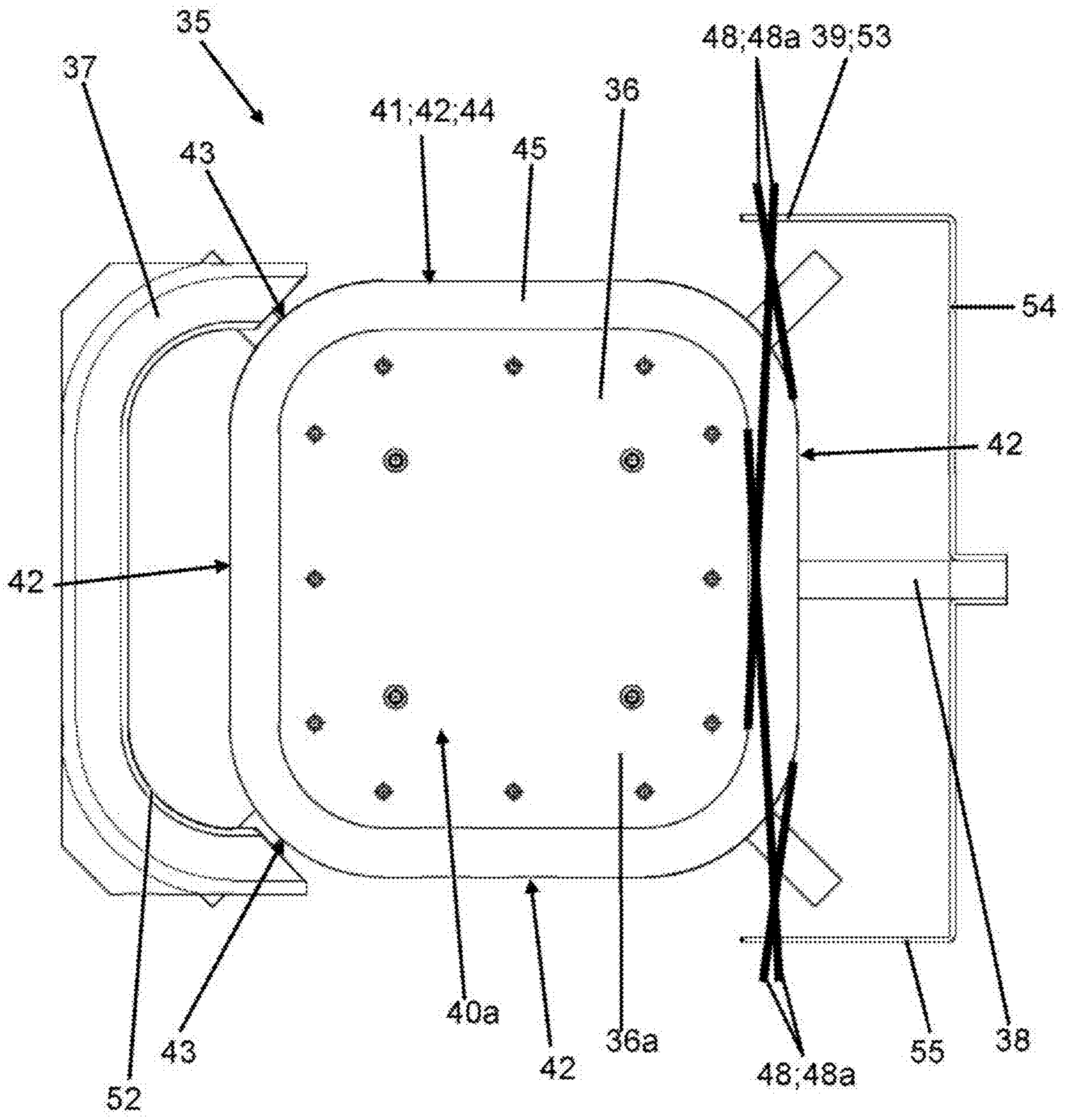
FIG. 8 is a top view of the mold according to FIG. 6.

The production of the cover wall 4 by means of the process according to the invention is preferably effected by means of a molding device or a molding tool 35 according to the invention (FIG. 6-8).

The molding device 35 has an inner mold 36, preferably at least one outer mold shell 37, a stand 38, and a tension element holding part 39.

The stand 38 serves to erect the molding device 35 on the respective ground. Accordingly, both the inner mold 36 and the tension element holding part 39 are fastened to the stand 38.

The inner mold 36 can be cuboid-shaped and has a, preferably planar, mold upper side 40*a* and a, preferably planar, mold bottom side 40*b* located vertically oppositely to the mold upper side 40*a*. The inner mold 36 can be made of metal sections or reinforce plastic sections, or similar. Furthermore, the inner mold 36 has a circumferential mold circumferential wall 41. The mold circumferential wall 41 has four wall long sides 42 that merge into each other pairwise via wall corner areas 43.

The mold circumferential wall 41 is a surface to be molded 44 or molding surface 44 of the molding device 35. The molding surface 44 serves to shape the cover wall 4. Accordingly, it has a molding contour corresponding to the contour of the cover wall 4 to be produced. In the present case, the molding surface 44 serves to produce a corrugated contour 15 with two corrugations 16. To produce a folded contour 11, the molding surface 44 has an appropriately adapted design.

The mold circumferential wall 41 or the molding surface 44 in particular has two molding sections 45 that are in particular vertically arranged adjacent to each other, circumferential, convex, and outwardly curved. The curved molding sections 45 serve to shape or create the corrugations 16. A circumferential, chute-like indentation 46 the shape of which corresponds to the shape of the wave trough 19 to be created is located between the two curved molding sections 45. Moreover, a circumferential groove 47 is present adjacent to each of the two curved molding sections 45. The one groove 47 is hence arranged between the upper curved molding section 45 and the mold upper side 40*a*, and the other groove 47 is arranged between the lower curved molding section 45 and the mold bottom side 40*b*.

According to the invention, the grooves 47 and the indentation 46 serve to accommodate tension elements 48 (FIG. 8), which is explained in more detail below.

The inner mold 36 can, e.g., be of a multi-part design and preferably consist of multiple, e.g., two, single plates 36*a;b* connected with each other detachably, in particular by means of screws. However, they can also be of any other split design.

The outer mold shell 37, which needs not necessarily be present, but can be provided e.g., if an especially smooth surface is desired, has a counter-molding surface 49 corresponding to the molding contour 44 of the inner mold 36. The outer mold shell 37 can likewise be of a multi-part design.

In particular, the counter molding surface 49 has two chute-like molding sections 50 that are in particular vertically arranged adjacent to each other, concave and inwardly curved, for creating the corrugations 16. The chute-like molding sections 50 are hence designed corresponding to the curved molding sections 45 of the inner mold 36.

An oblong elevation 51 corresponding to the indentation 46 of the inner mold 36 is located between the two chute-like molding sections 50, for creating a wave trough 19.

Moreover, adjacent to each of the two chute-like molding sections 50, the outer mold shell 37 has a corner edge 52 which is designed to correspond to one of the two grooves 47. The corner edges 52 in particular serve for positive engagement into one of the two grooves 47 during the molding process, which is explained in more detail below.

Furthermore, the outer mold shell 37 preferably is U-shaped. This is to enable the outer mold shell 37 to encompass one of the wall long sides 42 and the two adjoining wall corner areas 43 during molding.

The outer mold shell 37 can be moved relative to the inner mold 36, and in particular is supported on bearings in such a way that it can be pressed against, or be clamped with, the inner mold 36.

Moreover, the inner mold 36 and/or the outer mold shell 37 preferably can be heated.

The tension element holding part 39 is arranged opposite the outer mold shell 37. Moreover, it is preferably designed as a retaining plate. Also, it is likewise fastened to the stand 38.

The tension element holding part 39 likewise is preferably U-shaped and has a central holding part wall section 54 and two leg walls 55 that are attached to it and preferably project from it at right angles. The leg walls 55 each have a fixed end and an opposite free end with a, preferably vertical, end edge 56.

The central holding part wall section 54 preferably extends in parallel with one of the wall long sides 42, and the leg walls 55 extend towards the inner mold 36. They are in each case arranged adjacent to one of the wall corner areas 43.

Furthermore, the two leg walls 55 have three tension element receiving slots 56 arranged adjacent to each other. The tension element receiving slots 56 are preferably arranged one above the other in vertical direction. Each of them extends from the end edge 56 into the leg wall 55, preferably in horizontal direction, and ends in a slot end 57 that, e.g., is broadened.

Different from what is shown in the figures, the tension element receiving slots 56 can, according to a preferred embodiment, also taper in the direction of the respective slot ends 57, i.e., the slot width of the tension element receiving slots 56 reduces towards the slot end 57. In this way, tension elements 48 of various thickness can be tensioned well.

The edges of the tension element receiving slots 56 preferably are rounded to minimize the risk of damage to the tension elements 48 during tensioning.

The production process according to the invention for the production of a cover wall section 4*c* is explained in more detail in the following:

First, the multi-layer textile fabric 20 is produced by coating the reinforcing material 21 with the polymer coating 22 at least on one side, preferably on both sides.

The coating takes place preferably in an actually known manner, preferably using brush coating, calendering, extrusion, compression molding, spray coating, or injection molding. However, according to the invention, it is not compulsory that the polymer coating 22 is already cured, in particular vulcanized, before the desired molding.

Then, the tension elements 48 are inserted into the channels 23 in the cover wall material sheet made of the multi-layer fabric 20. The tension elements 48 can, e.g., be deformable elements, such as metal rods, which have at least a certain flexibility for bringing them into the desired shape, but that at the same time ensure a certain stabilization of the cover in its final shape.

Alternatively, the tension elements 48 can be inserted into the channels 23 already prior to the coating. This may make it especially easy to insert the tension elements 48 into the channels 23, because usually the reinforcing material 21 has a higher flexibility prior to the coating compared to after the coating, and/or the danger of narrowing of the channels 23, e.g., due to penetration of polymer during coating, is reduced. For example, the tension elements 48 can be inserted into the channels 23 created in the process directly during the weaving of the reinforcing material 21. Alternatively, the tension elements 48 can be inserted into the channels 23 after completion of the reinforcing material 21, but before the coating.

The oblong tension elements 48 preferably are flexible, elastic tension elements 48, preferably tensioning ropes or tensioning hoses. That is, the tension elements 48 are preferably limp or pliable.

In particular, the tension elements 48 preferably are corrugated tubes that are well bendable without kinking. They preferably are additionally braided, so that the tension elements 48 have a basically smooth outer surface and can hence be smoothly inserted into the channels 23.

Moreover, the tension elements 48 preferably are thermosetting. That is, they can be transferred from their flexible or pliable condition into a cured, dimensionally stable condition by heating. Other methods for curing the tension elements 48 can also be used. Basically, any type of physical or chemical curing is suitable. For example, curing by means of a chemical reaction can be used as an alternative or in addition to curing by heat. The curing needs not be complete but curing also means partial curing.

For example, the pliable, not dimensionally stable tension elements 48 are tensioning hoses that are filled with a material that can be cured by heat or by a chemical reaction. The tensioning hoses can be inserted into the channels 23 with the filling already provided, or they can be inserted into the channels 23 without filling and subsequently be filled, e.g., by means of a vacuum process. Alternatively, they can be tensioning ropes that are impregnated with a material that can be cured by heat or by a chemical reaction.

The thermosetting material preferably is a thermosetting polymer. The polymer preferably is a duroplast, such as an epoxy resin and/or a phenolic resin, and/or a thermoplastic polymer, or high-shore elastomer mixture.

As an alternative to a thermosetting material, a two-component system with a binder and a hardener can be used to transfer the tension elements 48 into the cured, dimensionally stable condition.

After insertion of the tension elements 48, the fabric 20 is draped over the molding surface 44 of the inner mold 36 together with the tension elements 48. The upper side of the fabric 20 lying on the molding surface 44 will later form the cover wall inner side 4*b*.

In particular, the fabric 20 is draped over the wall long side 42 that faces the mold shell 37, and over the two wall corner areas 43 adjoining that wall long side 42.

Preferably, the fabric 20 is reinforced in the area of the wall long side 42 and more elastic in the area of the two wall corner areas 43. Accordingly, the fabric 20 preferably has a lower elongation at maximum force $\square_H$ in accordance with DIN EN ISO 13934-1:2013 in the area of the wall long side 42 than in the two wall corner areas 43. A higher flexibility of the fabric 20 in the area of the wall corner areas 43 is beneficial for good molding. A low elongation at maximum force $\square_H$ in the area of the wall long side 42 makes it stiffer and gives the cover 1, in particular the bellows, stability.

After that, the fabric 20 is fixed in place, according to the invention, at the inner mold 36 by means of the tension elements 48 and stretched across the molding surface 44 (FIG. 8).

To this end, the tension elements 48 are clamped around the molding surface 44 preferably in such a way that one tension element 48 is arranged in the chute-like indentation 46 and a tension element 48 is arranged in each of the grooves 47.

In the preferred embodiment of the invention shown here, the tension elements 48 are clamped around the wall long side 42 that faces the mold shell 37, and around the adjoining wall corner areas 43, and around the two wall long sides 42 adjoining these, and around the wall corner areas 43 adjoining these. In the area of the wall long side 42 that faces the tension element holding part 39, the tension elements 48 cross each other and each of their free tension element ends 48*a* is clamped, in particular wedged, into one of the tension element receiving slots 56.

Hence, on the one hand, the fabric 20 is fixed at the inner mold 36 by means of the tension elements 48. On the other hand, the tension elements 48 make sure that the entire surface of the fabric 20 is in contact with the molding surface 44.

The tension elements 48 can also be tensioned by means of wire ropes or other tensioning devices. To this end, the end areas of the tension elements 48 can be connected to wire ropes or other tensioning devices that enable tensioning of the tension elements 48 against the molding surface 44. The necessary tensioning force can be achieved by mechanical, electrical, hydraulic, or pneumatic means, or by any other application of force.

After that, the outer mold shell 37 is moved in the direction of the inner mold 36 in such a way that the fabric 20 is arranged positively locking between them. In particular, the upper side of the fabric 20 that faces the outer mold shell 37 is in contact with the counter molding surface 49.

At least if the polymer coating 22 has not yet cured, and in particular is not yet vulcanized, heat is applied to at least one of the two molds 36;37, so that the polymer coating 22 cures, preferably is vulcanized.

To heat the molds 36;37, they can, e.g., be transferred into a heating chamber or an oven.

As an alternative, heating pipes or heating pads can be inserted into the molds 36;37 or the shaped parts.

Furthermore, the curing, preferably vulcanizing, of the polymer coating 22 and/or the curing of the tension elements 48 can be effected by applying UV or IR radiation, or hot air, or an electromagnetic field in an induction process. UV or IR radiation, hot air, or an electromagnetic field can initially be applied to the fabric 20 only from the outside, causing the polymer coating 22 or the tension elements 48 to cure completely or at least partly. If desired, the fabric 20 can subsequently be removed from the molds 36;37, and UV or IR radiation, hot air, or an electromagnetic field can then be applied for complete curing. The molds 36;37 can also be designed in such a way that the UV or IR radiation, the hot air, or the electromagnetic radiation can reach the fabric 20 through the molds 36;37. For example, the molds 36;37 can have holes. Furthermore, the mold 36 can be made of glass that is permeable to IR radiation, so that the UV or IR radiation, or an electromagnetic field reach the fabric 20 stretched across the molding surface 44 through the mold 36.

The curing of the polymer coating 22 fixes the fabric 20 in its basic shape. In the present case, the fabric 20 has a corrugated contour 15 with two corrugations 16 after curing. Moreover, it is U-shaped and has two cover wall corner areas 9. The cured fabric 20 hence forms a cover wall section 4*c* of a cover wall 4 to be produced.

Fixed in the basic shape means that the fabric 20 retains its basic shape in the absence of an external load. Of course, when used as cover wall 4, the fabric 20 can reversibly, in particular elastically, deform, to follow relative movements of components that are connected by the cover 1, in particular the bellows. However, the basic shape, i.e., the corrugated or folded contour 15;11, is basically retained in the process.

At the same time as the fabric 20, advantageously also the tension elements 48 cure due to the application of heat and become dimensionally stable.

After that, the cured fabric 20 with the cured tension elements 48 is removed from the molding device 35. The projecting areas of the tension elements 48 that are not required are preferably cut off.

Optionally, this can be followed by a sealing or plugging step, e.g., to close any openings that remain in the channels 23.

The cured fabric 20 and the cured tension elements 48 hence form a cover section, in particular a bellows section, of a cover 1 to be produced, in particular a bellows to be produced. The dimensionally stable fabric 20 forms a cover wall section 4*c*, in particular a bellows wall section, of the cover wall 4, in particular the bellows wall 4, and the cured dimensionally stable tension elements 48 form the cover tensioning frames 3, in particular the bellows tensioning frames, or at least part thereof.

Multiple cover sections produced in this way can then be put together to form a cover half or a complete cover 1. In particular, multiple bellows sections produced in this way can be put together to form a U-shaped bellows half or a complete bellows. To do this, in particular, the cover wall sections 4*c* can be appropriately sewed and/or bonded and/or glued together or be joined by means of frames. In the process, the tension elements 48 need not necessarily be joined together. It is sufficient if the cover wall sections 4*c* are joined together. If required, the tension elements 48 can, however, be joined, e.g., with the help of transfer profiles.

It is especially beneficial that the tension elements 48 are already integrated in the cover wall sections 4*c*. This makes subsequent assembly unnecessary. Since the tension elements 48 initially are flexible or limp or pliable, cover wall sections 4*c* with cover wall corner areas 9 can, moreover, be produced in one work step without a problem.

In particular, ring-shaped cover wall sections 4*c* can also be produced in one molding step by means of the process according to the invention. To do this, preferably one single fabric 20 is draped around the entire inner mold 36, the edge areas of the fabric 20 preferably overlapping, so that a closed ring is created. The connection of the edge areas of the fabric 20 can then be effected by vulcanizing the polymer coating 22. Preferably, the connection of the edge areas of the fabric 20 is effected already before the fabric 20 is draped around the mold 36—at least in an area between adjoining channels 23. For example, the edge areas can be sewed together.

In the process, one single outer mold shell 37 can be used and individual sections of the fabric 20 can be heated and cured one after the other, or multiple outer mold shells 37 can be used and the entire fabric 20 can be heated and cured in one work step.

In this way, a complete cover 1, in particular a complete bellows, with a closed, circumferential cover wall 4 can be produced in one molding step by means of the process according to the invention, without the need to subsequently join cover sections. To this end, the molds 36;37 have appropriate molding surfaces 44;49, e.g., with the appropriate number of curved or chute-like molding sections 45;50. In this case, the cover wall 4 consists of one single cover wall section 4*c* that can consist of one or multiple fabrics 20:

Because also, instead of one single fabric 20, multiple fabrics 20 can be draped around part of, or the entire, inner mold 36 with their edge areas overlapping to produce, e.g., U-shaped, or ring-shaped cover wall sections 4*c* in one work step. Also, multiple fabrics 20 can be draped adjacent to each other and overlapping in vertical direction. And a tension element 48 can, e.g., extend through multiple fabrics 20 arranged adjacent to each other.

According to a further embodiment of the invention, the tension elements 48 are not arranged in the channels 23 of the reinforcing material 21 but clamped on the outside around the fabric 20 draped over the inner mold 36. In this case as well, it is made sure that the entire surface of the fabric 20 is in contact with the molding surface 44, so that the corrugated contour 16 or the folded contour 11 is formed exactly. The tension elements 48 are removed after the molding process. Accordingly, only a cover wall section 4*c* without cover tensioning frame elements is produced.

And according to a further embodiment of the invention, only the tension elements 48 are cured and fixed in their shape during the curing and molding process. The polymer coating(s) of the fabric 20 is/are already cured, in particular vulcanized. The shape of the cover wall section 4*c* is hence fixed due to the fixing of the shape of the tension elements 48. In this case, the tension elements 48 are positioned in channels 23 of the reinforcing material 21, as described in accordance with the first embodiment.

Therefore, the advantage of the process according to the invention in particular is the high-quality molding of the cover wall 4 or of cover wall sections 4*c*, which is ensured by the use of the tension elements 48.

If the tension elements 48 are arranged in the channels 23 and cured in the same process, cover wall sections 4*c* with cover tensioning frame elements or a complete cover wall 4 with cover tensioning frames 3 of a cover 1, in particular of a bellows, can be produced in one work step.

The bellows according to the invention is preferably used for a gangway 58 where two vehicle parts 59*a;b* of a vehicle 60 are interconnected movably, in particular articulately, to protect the gangway 58 against weather and draft. The vehicle 60 preferably is an articulated bus 61 or a rail vehicle, in particular a passenger train, a tram, a metro car, or a subway car. The two vehicle parts 59*a;b* are connected in particular twistable relative to each other around a vertical rotary axis and/or relocatable relative to each other in the direction of travel and/or relocatable transverse to the direction of travel and/or rotatable around a longitudinal axis of the vehicle (rolling).

Moreover, the bellows according to the invention can also be a gangway bellows for protecting the transition area between a boarding bridge or stairs and the aircraft and/or the terminal.

Or the bellows according to the invention can be a gangway bellows for protecting the transition area between two parts of a building, e.g., to protect the transition area between a bridge and a building section.

The bellows can be formed of multiple sheet-like bellows elements (not shown) that each have two straight tensioning frame elements between which a fabric 20 is stretched.

Also, the cover according to the invention can be used as a transition element for protecting the transition area between two machine parts or other components that can move relative to each other to protect the transition area against outside influences, in particular soiling, and to seal it off from the surroundings. The transition element is connected to the two components analogous to the gangway 58 of the two vehicle parts 59*a;b*. The transition element can have various shapes, e.g., be sheet-like or be U-shaped or also have the shape of a gangway bellows. In this case, the cover tensioning frames 3 also have a corresponding shape. Accordingly, they can also be simply straight or rod-shaped.

In summary, therefore, the cover 1 according to the invention preferably is a transition element, preferably of a sheet-like design or with a rectangular cross-section or with a U-shaped cross-section, preferably a gangway bellows, for components, vehicles, building connections, or boarding bridges or stairs, the transition element, preferably the gangway bellows, serving to protect a transition area between two movably interconnected vehicle parts, or components, or between two parts of a building, or between an aircraft or a building and a boarding bridge, in particular between two articulately interconnected vehicle parts, or components, against outside influences. Each of the aforementioned uses is, on its own, a preferred use according to the invention.

Accordingly, the invention also concerns a vehicle 60, in particular a rail vehicle or an articulated bus 61, having at least two vehicle parts 59*a;b* that are interconnected movably, preferably articulately, at a gangway 58, the vehicle 60 having at least one transition element according to the invention, preferably a gangway bellows, in particular a folded or corrugated bellows 1;10, per gangway 58 that protects the gangway 58.

Moreover, the invention concerns a boarding bridge or stairs, the boarding bridge or stairs having at least one transition element according to the invention, preferably a gangway bellows, preferably a folded or corrugated bellows 1;10.

Also, the invention concerns a building connection having two building parts connected at a transition area, the building connection having at least one transition element according to the invention, preferably a gangway bellows, preferably a folded or corrugated bellows 1;10, to protect the transition area of the two building parts.

Moreover, the invention concerns a component connection having two components, preferably machine parts, connected at a transition area, the component connection having at least one transition element according to the invention, preferably a gangway bellows, preferably a folded or corrugated bellows 1;10, to protect the transition area of the two components.

As already explained, it is also within the scope of the invention that the reinforcing material 21 is of a multi-layer design and consists of multiple textile fabrics bonded together by a bonding layer consisting of a polymer. Also, a bonding layer consisting of a polymer can be present between the polymer coating 22 and the reinforcing material 21. Consequently, it is also within the scope of the invention that also, or only, the bonding layers cure only during the heating of the fabric 20. What matters is only that the fabric 20 itself can be cured by heat. To this end, it has at least one thermosetting polymer layer.

Moreover, it is also within the scope of the invention to produce a plain or non-corrugated and non-folded or non-contoured or areal cover wall section 4*c* without a folded or corrugated contour only by curing the tension elements 48. In this case, the fabric 20 is of an appropriate elastic design, preferably in accordance with DE 10 2011 107 370 A1. The curing of the tension elements 48 contributes to shaping and stiffening, so that the cover 1, in particular the bellows, retains its (basic) shape and in particular is less yielding also to forces that act in transverse direction or in cover circumferential direction 2*b* (or perpendicular to the cover lengthwise direction 2*a*). The basic shape can, e.g., be sheet-like, rectangular, or U-shaped, as described above.

Furthermore, the folds 12 and the corrugations 16 can also have a shape other than the shown shape. The corrugations 16 can, e.g., have a trapezoidal shape or a rectangular shape.

ITEMS

Embodiments of the present invention may be defined by any of the following items.

1. Molding process for the production of a cover wall section (4*c*) for a cover in which the cover wall section (4*c*) has at least one multi-layer fabric (20) that has a reinforcement (21) and, at least on one side, preferably on both sides, a polymer coating (22), involving the following process steps:

a) Provision of at least one multi-layer fabric (20);

b) draping of the at least one fabric (20) over a molding surface (44) of a mold (36) and stretching of the at least one fabric (20) across the molding surface (44) by means of at least one tension element (48);

c) curing of the at least one fabric (20) and/or the at least one tension element (48) in such a way that the cover wall section (4*c*) is fixed in its shape.

2. Molding process according to item 1, characterized in that the at least one fabric (20) is cured, and in particular heated up, in such a way that it is fixed in its shape; and/or the at least one tension element (48) is cured, and in particular heated up, in such a way that it is fixed in its shape.

3. Molding process according to item 1 or item 2, characterized in that a cover wall section (4*c*) having a folded or corrugated contour (11;15) with at least one fold (12) or corrugation (16) is produced;

the molding surface (44) for creating the folded or corrugated contour (11;15) has an appropriate molding contour;

the at least one fabric (20) is stretched over the molding surface (44) by means of the at least one tension element (48) in such a way that the at least one fabric (20) has the folded or corrugated contour (11;15); and the at least one fabric (20) and/or the at least one tension element (48) is cured, and in particular heated up, in such a way that the at least one fabric (20) is fixed in its shape that has the folded or corrugated contour (11;15).

4. Process according to item 2 or item 3, characterized in that at least the fabric (20) provided has at least one polymer layer of thermosetting polymer and the at least one polymer layer is cured when the fabric (20) is heated, causing the fabric (20) to be fixed in its shape that, in particular, has the folded or corrugated contour (11; 15), one or both polymer coatings (22) optionally being made of the thermosetting polymer.

5. Process according to any one of the aforementioned items, characterized in that the at least one tension element (48) is oblong and preferably is a pliable tension element (48), preferably a tensioning rope or a tensioning hose, especially preferably a corrugated, in particular braided, tube.

6. Process according to item 5, characterized in that the at least one tension element (48) is pliable prior to curing and in particular heating, and is fixed in its shape during curing, e.g., by heating, preferably the fabric (20) being fixed in its shape that has the folded or corrugated contour (11; 15) by fixing the tension element (48) in its shape.

7. Process according to item 6, characterized in that the at least one tension element (48) is a) a tensioning hose filled with a thermosetting material that cures during the heating of the tensioning hose; and/or b) a tensioning rope impregnated with a thermosetting material that cures during the heating of the tensioning rope, the thermosetting material preferably being a thermosetting polymer, preferably an epoxy resin and/or a phenolic resin, and/or a thermoplastic polymer, or high-shore elastomer mixture.

8. Process according to any one of the items 5 to 7, characterized in that the at least one oblong tension element (48), preferably prior to the draping, is arranged in a channel (23) of the fabric (20), preferably the reinforcing material (21), the fabric (20) preferably having a reinforcing material (21) with a backing fabric (24) made of warp threads (25) and weft threads (26), the warp and weft threads (25;26) being interwoven in such a way that the backing fabric (24) has both single-layer fabric areas (29) and at least one, at least two-layer, fabric area (30) with at least two fabric layers (31*a;b*) that are not joined together, so that the channels (23) are formed between the fabric layers (31*a;b*); and/or having a reinforcing material (21) that has two fabrics that are joined together in such a way that guides in the form of loops are formed that create the channel, the fabrics being joined together preferably by sewing, knitting, bonding or gluing, and/or each of the fabrics having at least one textile fabric, the textile fabric preferably being a woven fabric or knitwear, in particular a knitted or crocheted fabric; and/or having a textile spacer fabric made of two textile fabrics joined together by pile threads, the pile threads ensuring a distance between the two textile fabrics, so that at least one channel is formed, the textile spacer fabric preferably being a spacer woven fabric or spacer knitwear, preferably a knitted or crocheted spacer fabric.

9. Process according to any one of the items 5 to 8, characterized in that the at least one oblong tension element (48) is clamped around the molding surface (44) to tension the at least one fabric (20), preferably the tension element (48) or, in the case of multiple tension elements (48), at least part of the tension elements (48) being arranged in a chute-like indentation (46) of the molding surface (44), and/or preferably a wave trough (19) of the corrugated contour (15) or a fold edge (14*b*) of the folded contour (11) being formed in the area of the chute-like indentation (46).

10. Process according to any one of the aforementioned items, characterized in that multiple fabrics (20) are draped over the molding surface (44) in such a way that adjacent fabrics (20) overlap each other preferably in their edge areas, the fabrics (20) preferably being joined together in the overlapping edge areas by the curing of the polymer coatings (22).

11. Process according to any one of the aforementioned items, characterized in that in a molding step, a ring-shaped cover wall section (4*c*) or a complete ring-shaped cover wall (4) is produced from one single or multiple fabrics (20).

12. Process according to any one of the aforementioned items, characterized in that a first area of the at least one fabric (20) is stretched over an area of the molding surface (44) in which the molding surface (44) is highly curved; and a second area of the at least one fabric (20) is stretched over an area of the molding surface (44) in which the molding surface (44) is less curved, the fabric (20) having a higher elongation at maximum force □H in accordance with DIN EN ISO 13934-1:2013 in the area of the highly curved area than in the less curved area.

13. Process according to any one of the aforementioned items, characterized in that a mold shell (37) is used that has a counter molding surface (49) that corresponds to the molding surface (44), the mold shell (37) being moved in the direction of the inner mold (36) prior to the heating in such a way that the at least one fabric (20) is arranged positively locking between them and preferably an upper side of the at least one fabric (20) facing the outer mold shell (37) is in contact with the counter molding surface (49).

14. Process according to any one of the items 5 to 13, characterized in that the at least one oblong tension element (48) is clamped on the outside, around the fabric (20) draped over the mold (36).

15. Cover (1) with a cover wall (4) that preferably has a folded or corrugated contour (11;15), characterized in that the cover wall (4) has at least one cover wall section (4*c*) produced in accordance with the process according to any one of the aforementioned items.

16. Cover (1) with folded contour (11) according to item 15, characterized in that the folded contour (11) has multiple folds (12) adjacent to each other, the folds (12) each having fold flanks (13) that merge into each other pairwise via alternating inner and outer fold edges (14*a;b*), and the cover wall (4) being clamped into a cover tensioning frame (3) at least at part of the fold edges (14*a;b*), the cover tensioning frame (3) consisting of at least one cured tension element (48) and being arranged in a channel (23) of the cover wall (4), and optionally channels (23), in which cover tensioning frames (3) in the form of cured tension elements (48) are arranged, being provided both in the inner and the outer fold edges (14*a;b*).

17. Cover (1) with corrugated contour (15) according to item 15, characterized in that the corrugated contour (15) has multiple, in particular U-shaped, corrugations (16) adjacent to each other that each merge into each other via a corrugation edge (18), the cover wall (4) being clamped into a cover tensioning frame (3) at least at part of the corrugation edges (18), the cover tensioning frame (3) consisting of at least one cured tension element (48) and being arranged in a channel (23) of the cover wall (4).

18. Cover (1) according to any one of the items 15 to 17, characterized in that the cover (1) is of a sheet-like design or has a rectangular cross-section or a U-shaped cross-section and has at least two cover tensioning frames (3), the cover wall (4) being clamped into the cover tensioning frames (3) or being stretched by them.

The invention claimed is:

1. A molding process for the production of a cover wall section of a folded or corrugated gangway bellow in which the cover wall section has at least one multi-layer fabric that has a reinforcement and, at least on one side, a polymer coating, the process comprising the steps of:

a) providing at least one multi-layer fabric;

b) draping the at least one fabric over a molding surface of a mold;

c) stretching the at least one fabric across the molding surface with at least one tension element to form at least one fold or corrugation of the gangway bellow, the at least one tension element extends along an inner corrugation edge or fold edge of the cover wall section, and the at least one tension element includes tension elements that cross each other; and d) curing the at least one fabric and/or the at least one tension element in such a way that the cover wall section is fixed in shape.

2. The molding process according to claim 1, wherein the step of curing the at least one fabric and/or the at least one tension element comprises heating the respective at least one fabric and/or the at least one tension element in such a way that it is fixed in its shape.

3. The molding process according to claim 1, wherein:

the process comprises producing a cover wall section having a folded or corrugated contour with at least one fold or corrugation;

the molding surface for creating the folded or corrugated contour has an appropriate molding contour;

the step of stretching comprises stretching the at least one fabric over the molding surface by the at least one tension element in such a way that the at least one fabric has the folded or corrugated contour; and the step of curing comprises curing the respective at least one fabric and/or the at least one tension element in such a way that the at least one fabric is fixed in its shape that has the folded or corrugated contour.

4. The molding process according to claim 2, wherein the fabric provided has at least one polymer layer of thermosetting polymer and the at least one polymer layer is cured when the fabric is heated, causing the fabric to be fixed in its shape.

5. The molding process according to claim 1, wherein the at least one tension element is oblong and is a pliable tension element.

6. The molding process according to claim 5, wherein prior to the curing process the at least one tension element is pliable and is fixed in its shape during curing.

7. The molding process according to claim 6, wherein the step of curing comprises the fabric being fixed in its shape having a folded or corrugated contour by fixing the tension element in its shape.

8. The molding process according to claim 6, wherein the at least one tension element comprises:

a tensioning hose filled with a thermosetting material that cures during heating of the tensioning hose; and/or a tensioning rope impregnated with a thermosetting material that cures during heating of the tensioning rope;

wherein the thermosetting material is a thermosetting polymer, an epoxy resin, a phenolic resin, a thermoplastic polymer, or a high-shore elastomer mixture.

9. The molding process according to claim 5, wherein:

the step of draping comprises the at least one oblong tension element arranged in a channel of the fabric.

10. The molding process according to claim 5, wherein the at least one oblong tension element is clamped around the molding surface to tension the at least one fabric.

11. The molding process according to claim 10, wherein the tension element or, in the case of multiple tension elements, at least part of the tension elements, are in a chute-like indentation of the molding surface, and/or a wave trough of the corrugated contour or a fold edge of the folded contour being formed in the area of the chute-like indentation.

12. The molding process according to claim 1, wherein the at least one fabric comprises multiple fabrics, the draping step comprising draping the multiple fabrics over the molding surface in such a way that adjacent ones of the multiple fabrics overlap each other in edge areas, the fabrics being joined together in the overlapping edge areas by curing of the polymer coatings.

13. The molding process according to claim 1, wherein the step of molding comprises a ring-shaped cover wall section or a complete ring-shaped cover wall is produced from one single or multiple fabrics.

14. The molding process according to claim 1, wherein:

the step of molding comprises a first area of the at least one fabric being stretched over an area of the molding surface in which the molding surface is highly curved and a second area of the at least one fabric being stretched over an area of the molding surface in which the molding surface is less curved;

wherein the fabric has a higher elongation at maximum force En in accordance with DIN EN ISO 13934-1:2013 in the area of the highly curved area than in the less curved area.

15. The molding process according to claim 1, wherein the step of molding comprises providing a mold shell used with a counter molding surface that corresponds to the molding surface, the mold shell being moved in a direction of the inner mold prior to heating in such a way that the at least one fabric is arranged positively locking between the shell and counter surface.

16. The molding process according to claim 5, wherein the at least one oblong tension element is clamped on an outside, around the fabric draped over the mold.

17. The molding process according to claim 1, wherein the at least one tension element is clamped to a tension holding element part.

* * * * *